(12) United States Patent
Kwan et al.

(10) Patent No.: US 9,758,661 B2
(45) Date of Patent: Sep. 12, 2017

(54) SELF-SINKING AND AIR PERMEABLE PLASTIC MATERIAL

(71) Applicants: Tak Kwong Kwan, Georgetown (CA); Hang Bi, Georgetown (CA)

(72) Inventors: Tak Kwong Kwan, Georgetown (CA); Hang Bi, Georgetown (CA)

( * ) Notice: Subject to any disclaimer, the term of this patent is extended or adjusted under 35 U.S.C. 154(b) by 0 days.

(21) Appl. No.: 14/831,847

(22) Filed: Aug. 20, 2015

(65) Prior Publication Data

US 2017/0051141 A1    Feb. 23, 2017

(51) Int. Cl.
*C08L 27/06* (2006.01)
*C08L 31/04* (2006.01)

(52) U.S. Cl.
CPC ........... *C08L 27/06* (2013.01); *C08L 2201/08* (2013.01); *C08L 2205/035* (2013.01); *C08L 2207/24* (2013.01)

(58) Field of Classification Search
None
See application file for complete search history.

(56) References Cited

U.S. PATENT DOCUMENTS

| 3,951,894 | A | * | 4/1976 | Whelan, Jr. | ............. | C08K 3/10 |
| | | | | | | 524/111 |
| 5,561,191 | A | * | 10/1996 | Lundquist | ................ | C08F 8/00 |
| | | | | | | 252/400.31 |
| 6,140,380 | A | * | 10/2000 | Mauk | ........................ | C08J 9/06 |
| | | | | | | 516/11 |
| 7,472,895 | B2 | | 1/2009 | Watt | | |
| 2007/0176155 | A1 | * | 8/2007 | Granada, Jr. | ............. | C01F 5/14 |
| | | | | | | 252/601 |
| 2009/0308001 | A1 | * | 12/2009 | Wu | ........................ | E04B 1/762 |
| | | | | | | 52/173.3 |

FOREIGN PATENT DOCUMENTS

| CN | 2714554 Y | 8/2005 |
| CN | 201250147 Y | 6/2009 |
| CN | 101880428 B | 6/2011 |
| CN | 202953876 U | 5/2013 |

* cited by examiner

*Primary Examiner* — Peter A Salamon
(74) *Attorney, Agent, or Firm* — Richard D. Okimaw

(57) ABSTRACT

A composition comprising: a polyvinyl chloride resin; a first rubber component; a second rubber component; at least one copolymer; at least one low temperature plasticizer; at least one filler comprising antimony trioxide; at least one heat stabilizer; at least one internal lubricant; at least one antioxidant; and at least one biofouling agent.

19 Claims, No Drawings

SELF-SINKING AND AIR PERMEABLE PLASTIC MATERIAL

FIELD OF THE INVENTION

The present invention is in the field of PVC (polyvinyl chloride) compositions. More particularly, it relates to PVC and nitrile rubber blends with low viscosities and low melting points comprising a varying amount of filler. In particular, the disclosure pertains to PVC compositions useful with producing a self-sinking plastic material that when extruded into a tube will diffuse air evenly along its entire length.

BACKGROUND OF THE DISCLOSURE

Aquatic pools, fishponds, sewage lagoons, wastewater treatment and/or fishing farms usually requires aeration devices to maintain the concentration of dissolved oxygen, which is necessary for aquatic underwater organisms and microorganisms, the stabilization of water quality, and the ecological balance of aquatic pools. Microorganisms require the absorption of dissolved oxygen from the water to decompose the redundant organic material and to perform nitrification and lower toxicities. The mixing of small air bubbles and water increases the concentration of dissolved oxygen of the pool water and promotes the decomposition rate of the organic materials by microorganisms.

Aeration systems and tubes can provide major increases in the oxygen concentration in a given water body. Current porous aeration tubes on the market today employ heavy loads that cause the tubes to sink to the bottom of an aquatic pool. There are additional disadvantages that include: weak aerobic capacity, easily clogged pores, and subsequently water that cannot easily be discharged.

Pollution and the preservation of water resources is a major global concern, but in some water body it is often difficult to provide aeration at the bottom and cumbersome and expensive installation methods greatly reduces the likelihood of widespread implementation. Therefore, in view of these limitations there is a need for improved aeration systems and tubing for oxygenation of a given water body.

SUMMARY OF THE INVENTION

A composition comprising: a polyvinyl chloride resin; a first rubber component; a second rubber component; at least one copolymer; at least one low temperature plasticizer; at least one filler comprising antimony trioxide; at least one heat stabilizer; at least one internal lubricant; at least one antioxidant; and at least one biofouling agent.

DETAILED DESCRIPTION OF THE EMBODIMENTS

The following is a detailed description of certain specific embodiments of the self-sinking PVC tubing compositions disclosed herein.

Definitions

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the following specification and attached claims are approximations that can vary depending upon the desired properties sought to be obtained. It is noted that, as used in this specification and the appended claims, the singular forms "a," "an," and "the," include plural references unless expressly and unequivocally limited to one referent. As used herein, the term "include" and its grammatical variants are intended to be non-limiting, such that recitation of items in a list is not to the exclusion of other like items that can be substituted or added to the listed items. As used herein, the term "comprising" means including elements or steps that are identified following that term, but any such elements or steps are not exhaustive, and an embodiment can include other elements or steps.

Introduction

In one aspect, disclosed herein are compositions comprising: a polyvinyl chloride resin; a first rubber component; a second rubber component; at least one copolymer; at least one low temperature plasticizer; at least one filler comprising antimony trioxide; at least one heat stabilizer; at least one internal lubricant; at least one antioxidant; and at least one biofouling agent.

In some embodiments, the polyvinyl chloride resin comprises a PVC/VA (polyvinyl chloride/polyvinyl acetate copolymer) with an inherent viscosity of between about 0.5 to 0.9 and a K-value of between about 56 to 64.

In some embodiments, the first rubber component is present in an amount between about 1 to 20 parts per hundred parts of resin.

In some embodiments, the second rubber component is present in an amount between about 45 to 65 parts per hundred parts of resin.

In some embodiments, the copolymer comprises at least one ethylene copolymer.

In some embodiments, the low temperature plasticizer comprises di-octyl adipate, Tris-2-Ethylhexyl-Trimellitate or combinations thereof.

In some embodiments, the antimony trioxide is present in an amount between about 50 to 175 parts per hundred parts of resin.

In some embodiments, the polyvinyl chloride resin comprises a PVC/VA with an inherent viscosity of between about 0.7 to 0.8 and a K-value of between about 59 to 62.

In some embodiments, the first rubber component comprises an amount of NBR between about 5 to 15 parts per hundred parts of resin.

In some embodiments, the second rubber component comprises an amount of 15 to 115 mesh crumbed tire between about 45 to 65 parts per hundred parts of resin.

In some embodiments, the copolymer comprises an amount of ethylene-vinyl acetate between about 10 to 40 parts per hundred parts of resin.

In some embodiments, the low temperature plasticizer comprises an amount of di-octyl adipate between about 45 to 55 parts per hundred parts of resin, an amount of Tris-2-Ethylhexyl-Trimellitate between about 45 to 55 parts per hundred parts of resin or a combinations thereof.

In some embodiments, the antimony trioxide is present in an amount between about 60 to 165 parts per hundred parts of resin.

In some embodiments, the at least one heat stabilizer comprising an amount of calcium stearate between about 1 to 4 parts per hundred parts of resin, an amount of zinc stearate between about 1 to 4 parts per hundred parts of resin or a combinations thereof.

In some embodiments, the at least one internal lubricant is present in an amount between about 0.01 to 0.05 parts per hundred parts of resin.

In some embodiments, the at least one antioxidant is present in an amount between about 0.005 to 0.075 parts per hundred parts of resin.

In some embodiments, the at least one biofouling agent is selected from the group consisting of glycine betaine, sulfobetaine, titanium dioxide nanotubes or combinations thereof.

In some embodiments, the composition comprises a) the polyvinyl chloride resin comprises a PVC/VA with an inherent viscosity of between about 0.7 to 0.8 and a K-value of between about 59 to 62; b) the first rubber component comprises an amount of NBR between about 7 to 13 parts per hundred parts of resin; c) the second rubber component comprises an amount of 20 to 110 mesh crumbed tire between about 50 to 60 parts per hundred parts of resin; d) the copolymer comprises an amount of ethylene-vinyl acetate between about 15 to 35 parts per hundred parts of resin; e) the low temperature plasticizer comprises an amount of di-octyl adipate between about 45 to 55 parts per hundred parts of resin, an amount of Tris-2-Ethylhexyl-Trimellitate between about 45 to 55 parts per hundred parts of resin or a combination thereof; d) the antimony trioxide is present in an amount between about 60 to 165 parts per hundred parts of resin; e) the at least one heat stabilizer comprising an amount of calcium stearate between about 1 to 4 parts per hundred parts of resin, an amount of zinc stearate between about 1 to 4 parts per hundred parts of resin or a combination thereof; f) the at least one internal lubricant is present in an amount between about 0.01 to 0.05 parts per hundred parts of resin; and g) the at least one antioxidant is present in an amount between about 0.005 to 0.075 parts per hundred parts of resin, wherein the at least one biofouling agent is selected from an amount of glycine betaine between about 0.02 to 0.03 parts per hundred parts of resin, an amount of sulfobetaine between about 0.02 to 0.03 parts per hundred parts of resin, an amount of titanium dioxide nanotubes between about 0.04 to 0.06 parts per hundred parts of resin or combinations thereof.

In some embodiments, the composition comprises a) the polyvinyl chloride resin comprises a PVC/VA with an inherent viscosity of between about 0.7 to 0.8 and a K-value of between about 59 to 62; b) the first rubber component comprises an amount of NBR between about 7 to 13 parts per hundred parts of resin; c) the second rubber component comprises an amount of 20 to 110 mesh crumbed tire between about 50 to 60 parts per hundred parts of resin; d) the copolymer comprises an amount of ethylene-vinyl acetate between about 15 to 35 parts per hundred parts of resin; e) the low temperature plasticizer comprises an amount of di-octyl adipate between about 45 to 55 parts per hundred parts of resin, an amount of Tris-2-Ethylhexyl-Trimellitate parts per hundred parts of resin or a combination thereof; e) the antimony trioxide is present in an amount of about 120.9 parts per hundred parts of resin, 86.9 parts per hundred parts of resin, 133.5 parts per hundred parts of resin, 135.9 parts per hundred parts of resin or 138 parts per hundred parts of resin; f) the at least one heat stabilizer comprising an amount of calcium stearate between about 1 to 4 parts per hundred parts of resin, an amount of zinc stearate between about 1 to 4 parts per hundred parts of resin or a combination thereof; g) the at least one internal lubricant is present in an amount between about 0.01 to 0.05 parts per hundred parts of resin; and h) the at least one antioxidant is present in an amount between about 0.005 to 0.075 parts per hundred parts of resin, wherein the at least one biofouling agent is selected from an amount of glycine betaine between about 0.02 to 0.03 parts per hundred parts of resin, an amount of sulfobetaine between about 0.02 to 0.03 parts per hundred parts of resin, an amount of titanium dioxide nanotubes between about 0.04 to 0.06 parts per hundred parts of resin or combinations thereof.

In some embodiments, the composition comprises a) the polyvinyl chloride resin comprises PVC/VA (polyvinylchloride/polyvinyl acetate copolymer) with an inherent viscosity of about 0.787, and a K-value of about 60.9; b) the first rubber component comprises an amount of NBR of about 15 parts per hundred parts of resin; b) the second rubber component comprises an amount of 20 to 110 mesh crumbed tire of about 40 parts per hundred parts of resin; c) the copolymer comprises an amount of ethylene-vinyl acetate of about 25 parts per hundred parts of resin; d) the low temperature plasticizer comprises an amount of di-octyl adipate of about 50 parts per hundred parts of resin and an amount of Tris-2-Ethylhexyl-Trimellitate of about 50 parts per hundred parts of resin; e) the antimony trioxide is present in an amount of about 120.9 parts per hundred parts of resin, 86.9 parts per hundred parts of resin, 133.5 parts per hundred parts of resin, 135.9 parts per hundred parts of resin or 138 parts per hundred parts of resin; f) the at least one heat stabilizer comprises an amount of calcium stearate of about 3 parts per hundred parts of resin and an amount of zinc stearate of about 3 parts per hundred parts of resin; g) the at least one internal lubricant comprises an amount of stearic acid of about 0.03 parts per hundred parts of resin; h) the at least one antioxidant comprises an amount of ADK STAB AO-50 (Octadecyl 3-(3,5-di-tert-butyl-4-hydroxyphenyl) propionate) of about 0.025 parts per hundred parts of resin; and wherein the at least one biofouling agent comprises an amount of glycine betaine of about 0.025 parts per hundred parts of resin, an amount of sulfobetaine of about 0.025 parts per hundred parts of resin and an amount of titanium dioxide nanotubes of about 0.05 parts per hundred parts of resin.

Polyvinylchloride

PVC (Polyvinyl chloride) resin has a combination of properties which make it particularly suitable for use as a structural material. In applications in which impact strength of the structural plastic is important, the PVC can be formulated with impact-modifier resins which improve the impact strength of the resulting composition. Such high impact-strength PVC compositions can be readily extruded or otherwise formed into a variety of articles which have excellent impact strength, toughness and other desired mechanical and chemical properties.

The PVC constituent can comprise a mixture of a homopolymer and one or more copolymers of vinyl chloride and/or chlorinated PVC or a mixture of two or more copolymers of vinyl chloride and/or chlorinated PVC. In the disclosure herein, the PVC component can be copolymer of vinyl chloride and one or more other monomers, for example, VA (vinyl acetate) and the like, vinylidene halides such as vinylidene chloride, alkyl esters of carboxylic acids such as acrylic acid, ethyl acrylate, 2-ethylhexyl acrylate and the like, unsaturated hydrocarbons such as ethylene, propylene, isobutylene and the like, allyl compounds such as allyl acetate and the like. In the use of a copolymer of vinyl chloride, it is preferred that the vinyl chloride content comprise at least about 80 wt % of the copolymer. In some embodiments, the PVC constituent of the composition of the present invention comprises a copolymer of vinyl chloride with VA, particularly a copolymer having a K-value of from about 56 to 64, most preferably from about 59 to 62.

Stabilizers for PVC

Polymers and copolymers of PVC and vinyl acetate can be sensitive to heat. For this reason, heat stabilizers are usually added to prevent the polymers from decomposing during normal processing.

The term "stabilizer" as used herein shall mean one or more organic or inorganic compounds useful for protection of PVC against thermal, ultraviolet light, and/or mechanical degradation. The stabilizer may enhance the effect of the stabilizer system for the PVC and/or act as an antioxidant or stabilizer for the NBR rubber as well. Examples of conventional stabilizers are disclosed in the Kirk-Othmer Encyclopedia of Chemical Technology, "Heat Stabilizers", vol 12, pages 1071-91(John Wiley, NY 1994), incorporated herein by reference, and is not intended to be limiting to the disclosure herein.

Stabilizers may include organotin compounds such as alkyltin, dialkyltin, aryltin, poly(dialkyltin maleate), dialkyltin bis(alkyl maleate), dialkyltin bis(2-alkylthioglycolate), where the alkyl group is $C_4$-$C_8$. Some stabilizers contain calcium, zinc, magnesium, lead, barium and cadmium salts or soaps. In some embodiments, the stabilizer is comprised of combinations of Ca—Zn, Ba—Ca—Zn and Ba—Zn. Moreover, mixtures of alkaline earth metal salts and polyhydric alcohols. Combinations of aluminum salts and calcium salts may also be used as stabilizer components.

Additional stabilizer components may include epoxy compounds, antioxidants (i.e. phenols or amines), polyols, phosphites, β-diketones, substituted amines and hydrotalcite. NBR rubbers typically utilize stabilizer systems including antioxidants of many classes (phenolic, amines and phosphites). Additional examples include sodium oleate, calcium stearate, zinc stearate, dioctyl phthalate, BHT (butylated hydroxy toluene), ESO (epoxidized soybean oil), and a variety of barium-zinc salt compounds. In some embodiments, each stabilizer may be present in levels of about 0.01 to about 15.0, preferably about 0.5 to about 8.0, more preferably 2.0 to 4.0 parts per hundred parts of polyvinyl chloride resin. The levels of usage of the stabilizer vary by the chemical identity the active ingredient and by the number of stabilizers present in any stabilizer package.

Acrylonitrile-Butadiene Rubbers (NBR)

NBR (Acrylonitrile-Butadiene Rubber) may be classified by the International Institute of Synthetic Rubber Producers (IISRP). NBR is comprised of unsaturated copolymers of 2-propenenitrile and various butadiene monomers (1,2-butadiene and 1,3-butadiene). In some instances, these elastomers contain acrylonitrile to butadiene amounts of about 25 wt % to 50 wt %, 28 wt % to 39 wt % or 30 wt % to 35 wt % acrylonitrile. The disclosure herein pertains to a nitrile polymer blend comprised of acrylonitrile-butadiene copolymer blended with a PVC resin.

Crumb Rubber

The term "Crumb rubber" relates to a rubber material derived by reducing scrap tire or other rubber into uniform granules with the inherently reinforcing materials, such as steel and fiber removed along with any other type of inert contaminants such as dust, glass, or rocks. The crumb rubber can include particles of reclaimed rubber. Reclaimed rubber can be recycled rubber, which can be derived from synthetic and/or natural rubbers or plastics. In embodiments, the crumb rubber can be made of 100 percent recycled tires. At least a portion of the particles of reclaimed rubber can be passed through a series of mesh sieves before the crumb rubber is incorporated into the rubber composition. For example, from 10 percent to 50 percent of the particles of reclaimed rubber can be passed through a 30 to 100 mesh or other mesh sieve.

Biofouling Agents

The main sources of fouling in a given water body can be the result of sediments (i.e., scale, silt, algae and sludge), corrosion and bacterial activity. Lack of knowledge of aeration systems and equipment, taxonomy and ecology of tropical fouling organisms is a major stumbling block to development of effective systems for antifouling management.

Chemical fouling inhibitors can reduce fouling in many systems, mainly by interfering with the crystallization, attachment, or consolidation steps of the fouling process. Examples for water systems are: chelating agents, such as EDTA, long-chain aliphatic amines or polyamines, such as octadecylamine, helamin, and other suitable amines, organic phosphonic acids, such as etidronic acid, or polyelectrolytes, such as polyacrylic acid and polymethacrylic acid.

Non-toxic anti-fouling coatings or embedded components are hydrophilic coatings. These coatings or embedded components rely on hydration whereby the substitution of water for proteins and microorganisms is minimized. Some examples without limiting the disclosure herein are coatings based on hydrated zwitterions, such as glycine betaine and sulfobetaine. These coatings or embedded components prevent bacteria attachment and biofilm formation.

The ability of carbon nanotubes (CNTs) to undergo surface modification allows them to form nanocomposites (NCs) with materials such as polymers, metal nanoparticles, biomolecules and metal oxides. The biocidal nature, protein fouling resistance, and fouling release properties of CNT-NCs render them the perfect material for biofouling prevention.

The disclosure herein employs at least one biofouling agent is selected from the group consisting of glycine betaine, sulfobetaine, titanium dioxide nanotubes or combinations thereof, wherein the biofouling agent is mixed with the self-sinking PVC tubing compositions described herein. Therefore, the biofouling agent is embedded at the surface of the tubing after further compounding using melt extrusion whereby the composition is formed into any desired shape (i.e., tubing).

Furthermore, fouling can be reduced by maintaining a relatively high fluid velocity throughout the aeration tubing.

Compounding

During the compounding process the PVC resin is combined with a other components, including heat stabilizers, lubricants and plasticizers. Additional additives may include fillers, antioxidants, etc. Additives may influence or determine mechanical properties, UV light and thermal stability, etc. In the compounding process, the additives are mixed with the PVC resin. In one embodiment, the compounding method employs a high-speed mixer that thoroughly blends all the components. The result is a semi-dry to dry powder, which may be fed into processing equipment.

The blends obtained from the mixing process can be further compounded with a mixer such as a Banbury batch mixer, a Farrel Continuous Mixer or a single or twin screw extruder. In some embodiments, the semi-dry to dry blend may be mixed using a Brabender mixer, a Henschel mixer or a ribbon blender. In some embodiments, the semi-dry to dry blend may be further compounded using melt extrusion and formed into any desired shape (i.e., pellet, tubing, etc.).

EXAMPLES

The powdered PVC/VA (polyvinyl chloride/polyvinyl acetate copolymer, ethyl-vinyl acetate copolymer were placed in a high intensity 500 Henschel dry powder mixer along with the stabilizers. The PVC/VA and stabilizers calcium stearate and zinc stearate were mixed with sufficient shear to raise the temperature of the coated PVC to at least about 80° C.

Then, the TOTM (Tris-2-Ethylhexyl-Trimellitate) and DOA (di-octyl adipate) were added to the PVC/VA in the mixer and the temperature lowers for about 5 minutes from about 80° C. to about 60° C. During this time the TOTM and DOA are absorbed the mixture forms a dry to wet powder.

After about 8 to 10 minutes the NBR rubber and meshed tire were blended with the PVC/VA as well as the remaining components including the filler, stearic acid, antioxidant (ADK STAB AO-50) and biofouling agents (glycine betaine, sulfobetaine, titanium dioxide nanotubes). Then, the mixture was intimately blended and after about 5 minutes the temperature lowers to about 40° C. At this time, the mixture was added to a 1000 cooler mixer and the mixture was allowed to cool to room temperature.

The mixture was transferred from the cooler mixture and fluxed through an extruder with a first zone temperature of about 175° C., a second/third zone temperature of 145° C. and a fourth zone temperature of 120° C. to yield blends showing good physical properties. During extrusion the blend is passed through a die with a blade that cuts the pelletized material to form pellets with a diameter of about 5 mm and a length of about 3 mm. The, a cooling system cools the pellets from about 125° C. to room temperature. Table 1 shows the components and relative parts-per-hundred amounts used to prepare Examples 1A-1E.

in particular, the amount and type of filler are predetermined depending on the inner diameter and outer diameter of the tube, the depth of the body of water and the type of application site (i.e., fish farm, environmental treatment facility, etc.).

For example, at a fish or shrimp farming application site the depth may be about 2 m to 3 m to the bottom of the body of water. In some embodiments, the amount and type of filler and the inner diameter and outer diameter of the tube are selected to have a specific gravity suitable for a surface water and/or environmental treatment at a depth of about 5 m. In some embodiments, the amount and type of filler and the inner diameter and outer diameter of the tube are selected to have a specific gravity suitable for deicing of a lake or pond at a depth of about 15 m. In some embodiments, the amount and type of filler and the inner diameter and outer diameter of the tube are selected to have a specific gravity suitable for a surface water aeration of a body of water with a large surface area at a depth of about 20 m and a length of about 10 km or less. In some embodiments, the amount and type of filler and the inner diameter and outer diameter of the tube are selected to have a specific gravity suitable for agitation to create a bubble curtain and/or bubble barrier in a harbor at a depth of about 100 m. Therefore, as the outer diameter increases the volume of the tube and the wall thickness both increase. As such, the addition of more or less filler with the disclosed compositions is needed to produce a tube with the desired specific gravity, which enables the tube to sink to an appropriate depth at a specific application site.

TABLE 1

Formulations 1A-1E

| Components | Description | PHR (Parts-per-Hundred Resin) | | | | |
|---|---|---|---|---|---|---|
| | | 1A | 1B | 1C | 1D | 1E |
| NBR | Buna-N, Perbunan, acrylonitrile butadiene rubber | 10 | 10 | 10 | 10 | 10 |
| CRUMBED TIRE | 30-100 Mesh | 55 | 55 | 55 | 55 | 55 |
| PVC/VA | PVC/VA Copolymer resins, Inherent viscosity = 0.787, K-value = 60.9 | 100 | 100 | 100 | 100 | 100 |
| EVA742 | Ethylene-vinyl acetate | 20 | 25 | 25 | 25 | 25 |
| DOA | Di-octyl adipate low temperature plasticizer | 50 | 50 | 50 | 50 | 50 |
| TOTM | Tris-2-Ethylhexyl-Trimellitate | 50 | 50 | 50 | 50 | 50 |
| Antimony Trioxide | Filler | 120.9 | 86.9 | 133.5 | 135.9 | 138 |
| Calcium stearate | Heat stabilizer | 3 | 3 | 3 | 3 | 3 |
| Zinc stearate | Heat stabilizer | 3 | 3 | 3 | 3 | 3 |
| stearic acid | Internal Lubricant | 0.03 | 0.03 | 0.03 | 0.03 | 0.03 |
| ADK STAB AO-50 | Antioxidant | 0.025 | 0.025 | 0.025 | 0.025 | 0.025 |
| Glycine betaine | Biofouling agent | 0.025 | 0.025 | 0.025 | 0.025 | 0.025 |
| Sulfobetaine | Biofouling agent | 0.025 | 0.025 | 0.025 | 0.025 | 0.025 |
| TNT (titanium nanotube) | Biofouling agent | 0.05 | 0.05 | 0.05 | 0.05 | 0.05 |

Properties and Applications

The compositions disclosed herein are useful to produce highly environmentally resistant yet flexible plastic aeration tubing that is self-sinking, non-kinking and holds no memory when deployed. The self-sinking property of the tubing is attributed to the composition disclosed herein and There is no restriction on the length of the tube, and the tubing can be manufactured to cover a very large surface area. Compressed air enters the tubing creating an inner pressure along both sides of the entire length of tubing and allows the compressed air to release through a porous surface in the tubing, creating efficient micro-bubbles that prevent clogging and fowling, along the entire length of the tubing. The released air from the porous surface forms a bubble curtain of uniform and evenly dispersed fine bubbles that optimize the oxygen transfer, and lift water which aids in complete circulation throughout the water column surrounding the tube.

Since the tubing operates without moving parts or electrical components in the body of water at the application sire, the performance and efficiency is improved and with significantly reduced electrical and maintenance related costs in comparison to other aeration systems.

For deicing purposes, the air bubbles leaving the tubing also bring dense, heavier, warmer water from the depths of the body of water to the surface, which results in efficient inhibition of ice formation.

Additional properties derived from tubing manufactured from the disclosed compositions include but are not limited to strong physical properties such as high tensile strength, modulus and elongation; water proof and/or hydrophobic when the tubing is not in operation; flexible and is easy to install and is safe for the environment (i.e., does not contain lead); high oxygen transfer rate; highly resistant plastic material (chemicals, salinity, temperature).

In some embodiments, the tubing derived from the disclosed compositions has applications ranging from farm ponds and industrial projects and is suitable for fresh and salt water applications in shallow and deep bodies of water. Other applications include but are limited to commercial, government and private applications; aeration sewage lagoons; wastewater treatment process plants; leachate ponds; earthen ponds, dugouts and lakes, etc.; waterways and channels; storm water retention ponds; septic systems; aquaculture; deicing docks, power plant water intake, marina slips, shoreline and/or water retention structures, industrial ship docking, ocean freight & Maritime transport, pumping operations and nuclear power generating plants; efficient bottom-to-top water circulation and mixing for water treatment, deicing, and other related applications; pathogen reduction, whereby the bubbles lift deeper waters to the surface for UV exposure.

In some embodiments, the tubing derived from the disclosed compositions has applications ranging from underwater air bubble curtains for protecting fish and marine mammals from underwater blasting and pile driving noise; protecting marine mammals from offshore oil platforms and wind power farm construction and continuous operation vibrations and noises (i.e., machinery and engine noise); containing oil spills in a body of water within a selected area; controlling the movement of marine life, plants and debris. In some aspects, a bubble curtain and/or bubble barrier can control the movement of marine life and floating debris and control the migration of jellyfish, fish, seagrass, debris, sediments, etc. This may provide an improvement in water quality, including but not limited to improved water clarity, reduction of algae and reduced $H_2S$ and odor suppression.

While certain embodiments have been illustrated and described, it should be understood that changes and modifications can be made therein in accordance with ordinary skill in the art without departing from the technology in its broader aspects as defined in the following claims.

The present disclosure is not to be limited in terms of the particular embodiments described in this application. Many modifications and variations can be made without departing from its spirit and scope, as will be apparent to those skilled in the art. Functionally equivalent methods and compositions within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can of course vary. It is also to be understood that the terminology used herein is for the purpose of describing particular embodiments only, and is not intended to be limiting.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like, include the number recited and refer to ranges which can be subsequently broken down into subranges as discussed above. Finally, as will be understood by one skilled in the art, a range includes each individual member.

All publications, patent applications, issued patents, and other documents referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict definitions in this disclosure.

What is claimed is:

1. A composition comprising: a polyvinyl chloride resin; a first rubber component; a second rubber component; at least one ethylene copolymer; at least one low temperature plasticizer; at least one filler comprising antimony trioxide; at least one heat stabilizer; at least one internal lubricant; at least one antioxidant; and at least one biofouling agent.

2. The composition of claim 1, wherein the polyvinyl chloride resin comprises a PVC/VA (polyvinyl chloride/polyvinyl acetate copolymer) with an inherent viscosity of between about 0.5 to 0.9 and a K-value of between about 56 to 64.

3. The composition of claim 1, wherein the first rubber component is present in an amount between about 1 to 20 parts per hundred parts of resin.

4. The composition of claim 1, wherein the second rubber component is present in an amount between about 45 to 65 parts per hundred parts of resin.

5. The composition of claim 1, wherein the low temperature plasticizer comprises di-octyl adipate, Tris-2-Ethyl-hexyl-Trimellitate or combinations thereof.

6. The composition of claim 1, wherein the antimony trioxide is present in an amount between about 50 to 175 parts per hundred parts of resin.

7. The composition of claim 1, wherein the polyvinyl chloride resin comprises a PVC/VA with an inherent viscosity of between about 0.7 to 0.8 and a K-value of between about 59 to 62.

8. The composition of claim 1, wherein the first rubber component comprises an amount of NBR between about 5 to 15 parts per hundred parts of resin.

9. The composition of claim 1, wherein the second rubber component comprises an amount of 15 to 115 mesh crumbed tire between about 45 to 65 parts per hundred parts of resin.

10. The composition of claim 1, wherein the copolymer comprises an amount of ethylene-vinyl acetate between about 10 to 40 parts per hundred parts of resin.

11. The composition of claim 1, wherein the low temperature plasticizer comprises an amount of di-octyl adipate between about 45 to 55 parts per hundred parts of resin, an amount of Tris-2-Ethylhexyl-Trimellitate between about 45 to 55 parts per hundred parts of resin or a combinations thereof.

12. The composition of claim 1, wherein the antimony trioxide is present in an amount between about 60 to 165 parts per hundred parts of resin.

13. The composition of claim 1, wherein the at least one heat stabilizer comprising an amount of calcium stearate between about 1 to 4 parts per hundred parts of resin, an amount of zinc stearate between about 1 to 4 parts per hundred parts of resin or a combinations thereof.

14. The composition of claim 1, wherein the at least one internal lubricant is present in an amount between about 0.01 to 0.05 parts per hundred parts of resin.

15. The composition of claim 1, wherein the at least one antioxidant is present in an amount between about 0.005 to 0.075 parts per hundred parts of resin.

16. The composition of claim 1, wherein the at least one biofouling agent is selected from the group consisting of glycine betaine, sulfobetaine, titanium dioxide nanotubes or combinations thereof.

17. The composition of claim 1, comprising
a) the polyvinyl chloride resin comprises a PVC/VA with an inherent viscosity of between about 0.7 to 0.8 and a K-value of between about 59 to 62;
b) the first rubber component comprises an amount of NBR between about 7 to 13 parts per hundred parts of resin;
c) the second rubber component comprises an amount of 20 to 110 mesh crumbed tire between about 50 to 60 parts per hundred parts of resin;
d) the copolymer comprises an amount of ethylene-vinyl acetate between about 15 to 35 parts per hundred parts of resin;
e) the low temperature plasticizer comprises an amount of di-octyl adipate between about 45 to 55 parts per hundred parts of resin, an amount of Tris-2-Ethylhexyl-Trimellitate between about 45 to 55 parts per hundred parts of resin or a combination thereof;
f) the antimony trioxide is present in an amount between about 60 to 165 parts per hundred parts of resin;
g) the at least one heat stabilizer comprising an amount of calcium stearate between about 1 to 4 parts per hundred parts of resin, an amount of zinc stearate between about 1 to 4 parts per hundred parts of resin or a combination thereof;
h) the at least one internal lubricant is present in an amount between about 0.01 to 0.05 parts per hundred parts of resin; and
i) the at least one antioxidant is present in an amount between about 0.005 to 0.075 parts per hundred parts of resin,
wherein the at least one biofouling agent is selected from an amount of glycine betaine between about 0.02 to 0.03 parts per hundred parts of resin, an amount of sulfobetaine between about 0.02 to 0.03 parts per hundred parts of resin, an amount of titanium dioxide nanotubes between about 0.04 to 0.06 parts per hundred parts of resin or combinations thereof.

18. The composition of claim 1, comprising
a) the polyvinyl chloride resin comprises a PVC/VA with an inherent viscosity of between about 0.7 to 0.8 and a K-value of between about 59 to 62;
b) the first rubber component comprises an amount of NBR between about 7 to 13 parts per hundred parts of resin;
c) the second rubber component comprises an amount of 20 to 110 mesh crumbed tire between about 50 to 60 parts per hundred parts of resin;
d) the copolymer comprises an amount of ethylene-vinyl acetate between about 15 to 35 parts per hundred parts of resin;
e) the low temperature plasticizer comprises an amount of di-octyl adipate between about 45 to 55 parts per hundred parts of resin, an amount of Tris-2-Ethylhexyl-Trimellitate parts per hundred parts of resin or a combination thereof;
f) the antimony trioxide is present in an amount of about 120.9 parts per hundred parts of resin, 86.9 parts per hundred parts of resin, 133.5 parts per hundred parts of resin, 135.9 parts per hundred parts of resin or 138 parts per hundred parts of resin;
g) the at least one heat stabilizer comprising an amount of calcium stearate between about 1 to 4 parts per hundred parts of resin, an amount of zinc stearate between about 1 to 4 parts per hundred parts of resin or a combination thereof;
h) the at least one internal lubricant is present in an amount between about 0.01 to 0.05 parts per hundred parts of resin; and
i) the at least one antioxidant is present in an amount between about 0.005 to 0.075 parts per hundred parts of resin,
wherein the at least one biofouling agent is selected from an amount of glycine betaine between about 0.02 to 0.03 parts per hundred parts of resin, an amount of sulfobetaine between about 0.02 to 0.03 parts per hundred parts of resin, an amount of titanium dioxide nanotubes between about 0.04 to 0.06 parts per hundred parts of resin or combinations thereof.

19. The composition of claim 1, comprising
a) the polyvinyl chloride resin comprises PVC/VA (polyvinyl chloride/polyvinyl acetate copolymer) with an inherent viscosity of about 0.787, and a K-value of about 60.9;
b) the first rubber component comprises an amount of NBR of about 10 parts per hundred parts of resin;
c) the second rubber component comprises an amount of 20 to 110 mesh crumbed tire of about 55 parts per hundred parts of resin;
d) the copolymer comprises an amount of ethylene-vinyl acetate of about 25 parts per hundred parts of resin;
e) the low temperature plasticizer comprises an amount of di-octyl adipate of about 50 parts per hundred parts of resin and an amount of Tris-2-Ethylhexyl-Trimellitate of about 50 parts per hundred parts of resin;

f) the antimony trioxide is present in an amount of about 120.9 parts per hundred parts of resin, 86.9 parts per hundred parts of resin, 133.5 parts per hundred parts of resin, 135.9 parts per hundred parts of resin or 138 parts per hundred parts of resin;
g) the at least one heat stabilizer comprises an amount of calcium stearate of about 3 parts per hundred parts of resin and an amount of zinc stearate of about 3 parts per hundred parts of resin;
h) the at least one internal lubricant comprises an amount of stearic acid of about 0.03 parts per hundred parts of resin;
i) the at least one antioxidant comprises an amount of ADK STAB AO-50 (Octadecyl 3-(3,5-di-tert-butyl-4-hydroxyphenyl)propionate) of about 0.025 parts per hundred parts of resin; and
wherein the at least one biofouling agent comprises an amount of glycine betaine of about 0.025 parts per hundred parts of resin, an amount of sulfobetaine of about 0.025 parts per hundred parts of resin and an amount of titanium dioxide nanotubes of about 0.05 parts per hundred parts of resin.

* * * * *